(12) United States Patent
Higashigawa

(10) Patent No.: US 6,862,598 B2
(45) Date of Patent: Mar. 1, 2005

(54) LINK TREE FORMING APPARATUS, LINK TREE FORMING METHOD, AND LINK TREE FORMING PROGRAM

(75) Inventor: Levan Higashigawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 464 days.

(21) Appl. No.: 09/923,543

(22) Filed: Aug. 8, 2001

(65) Prior Publication Data

US 2002/0178142 A1 Nov. 28, 2002

(30) Foreign Application Priority Data

Mar. 26, 2001 (JP) ........................................ 2001-088696

(51) Int. Cl.⁷ .............................................. G06F 17/30
(52) U.S. Cl. .............................. 707/100; 707/3; 707/10; 707/103 R; 707/200
(58) Field of Search ......................... 707/3, 5, 10, 100, 707/103 R, 104, 200, 513; 709/107, 315, 316; 345/335, 418, 427, 848

(56) References Cited

U.S. PATENT DOCUMENTS 6,070,176 A * 5/2000 Downs et al. .............. 715/513
6,278,991 B1 * 8/2001 Ebert .......................... 707/3
6,295,057 B1 * 9/2001 Rosin et al. ................ 345/744

FOREIGN PATENT DOCUMENTS

JP 2000-200129 7/2000

* cited by examiner

Primary Examiner—Shahid Alam
Assistant Examiner—Fred Ehichioya
(74) Attorney, Agent, or Firm—Westerman, Hattori, Daniels & Adrian, LLP

(57) ABSTRACT

A link tree is able to be formed in a visually logical and natural form for a plurality of objects displayed on a screen. At the time of setting individually selectable links to form an overall object link tree for the plurality of objects displayed on the screen, first processing is carried out for setting a link between an m-th object and an n-th object when only the n-th object exists in a predetermined direction with reference to the m-th object, and second processing is alternatively carried out for setting a link based on a distance of each object existing in said predetermined direction from the m-th object when a plurality of objects exist in a predetermined direction with reference to the m-th object.

16 Claims, 15 Drawing Sheets

LINK TREE FORMING APPARATUS, LINK TREE FORMING METHOD, AND LINK TREE FORMING PROGRAM

BACKGROUND OF THE INVENTION

1. Field of the Invention

The present invention relates to a link tree forming method for setting individually selectable links for a plurality of objects displayed on a screen to form an overall object link tree.

2. Description of the Related Art

In general, a browser downloads HTML or similar contents from a server, and analyzes and displays those contents. By means of a keyboard, a mouse button, or a remote controller button, the user can shift the focus to, and select, a selectable item (Hyperlink, Object, etc.) within the displayed contents. Thus, when a browser is used on a machine that has a mouse, the user can make a selection simply by positioning the mouse pointer on the contents to be selected, and clicking a mouse button, but when a mouse is not used, as in the case of a WebTV, WebPAD or set-top box, operated only by means of a remote controller with a small number of buttons, or a portable terminal, etc., it is necessary for the browser to be capable of being fully operated with a limited number of buttons. With an apparatus that uses up/down buttons for one-dimensional move operations, link setting requires only the use of the array of selectable items (one-dimensional array) as is, but when cross-shaped move buttons (left, right, up, down) or the like are used for two-dimensional move operations, a two-dimensional move destination must be determined.

FIG. 23 is a flowchart showing a normal list tree formation procedure. When a Web Home Page is accessed, for example, contents are first downloaded from a URL (S700). The downloaded contents are analyzed, and laid out to enable them to be displayed by the browser (S701). From among the laid-out contents, a list of selectable items is created (S702), and finally a link tree of selectable items is created (S703).

In S703, basically a two-dimensionally selectable tree structure is created that makes it possible to focus on any selectable item by means of a move key operation. To be specific, an overall link tree is created by setting, for each selectable item, the next item as a right-direction link destination or a down-direction link destination in the one-dimensional list created in S702. In a one-dimensional list, selectable items are listed in order on the basis of the layout. Heretofore, links have been created simply with this list order as an absolute condition.

With this conventional method, there are many cases where it is not possible to move to the intended move destination, that is to say, what is visually the natural move destination. FIG. 24 shows an example of the result of link destination determination by the conventional method. In this drawing, selectable objects are numbered from 1 to 10, and those numbers constitute the list order. The origin of an arrow is a link source, and the end-point of an arrow is a link destination. In the drawing, visually it appears natural that (4) should be linked to (8) in a downward direction, but with the conventional method, (5), which appears earlier in the list, has priority as a link destination, and therefore (4) cannot be downward-linked to (8), but is downward-linked to (5). (There is a maximum of one link destination in one direction; a plurality of links cannot be created for one direction.) This linking method is unnatural for the user in visual terms, and the operation of a browser, etc., employing this kind of link setting is extremely user-unfriendly.

SUMMARY OF THE INVENTION

The present invention has been achieved by taking into account the points described above, and it is an object of the present invention to provide a link tree forming apparatus, link tree forming method, and link tree forming program whereby, when setting individually selectable links and creating an overall object link tree for a plurality of objects to be displayed on a screen, this is performed on the basis of both geometrical direction (position information) and distance, and the order of a one-dimensional list is not used as an absolute condition, so making it possible to form a link tree for focus movement by means of cross-shaped buttons, for example, that is visually natural and logical.

In order to solve the above described problems, in a link tree forming apparatus and a ink tree forming method according to the present invention, when setting individually selectable links to create an overall object link tree, position information on each object is first obtained. Then, on the basis of the position information, if only a single n-th object exists in a predetermined direction with reference to a basic or m-th object, a link is set between the m-th object and the n-th object, and if there exist a plurality of objects in a predetermined direction with reference to the basic or m-th object, a link is alternatively set based on the distance from the m-th object to each of the other objects existing in the predetermined direction. The flow up to the basic link tree creation is similar to that in the conventional example shown in FIG. 23, but in the present invention, the link tree creation method in S703 is different from the conventional method. In the present invention, by setting links based on the distances between objects, which are not taken into consideration in the conventional method, it has become possible to form a link tree that is visually natural in arrangement, and to provide excellent operability at the time of operating a browser (performing focus movement, selection, and like operations) by means of a cross-shaped button, for example.

In link setting, if there is a plurality of objects in the same direction with respect to a basic object, it is preferable for a link to be set for the object of which the distance to the basic object is the shortest. Moreover, if distance is taken as one of a horizontal screen distance, a vertical screen distance, and a distance based on both horizontal and vertical screen directions, it is possible to form a visually more natural link tree according to a variety of cases.

Also, In the present invention, a link tree more desirable for the user is formed by performing link setting in steps based on a variety of conditions, using the above-described processing method. In particular, the present invention is characterized by being provided with first setting means for setting a link to that one of a plurality of objects lying in a plurality of predetermined directions which exists in a first direction satisfying a first condition, and second setting means for setting a link to an object that exists in a second direction among the plurality of predetermined directions for which no link has been set by the first setting means, and which satisfies a second condition. Moreover, the present invention is characterized by being provided with third setting means for setting a link to an object existing in a third direction which is opposite to one of the first and second directions set by the first setting means and the second setting means, the third direction satisfying a third condition, and fourth setting means for setting a link to an object existing in a fourth direction which is opposite to the other of the first and second directions set by the first setting means and the second setting means and for which no link has been set by the third setting means, the fourth direction satisfying a fourth condition.

For example, in link formation for focus movement by means of a cross-shaped button in one embodiment of the present invention, the first setting means corresponds to a first step of setting a link in the right and downward directions. Also, the first condition is a condition for setting a link only to an object that exists in a visually completely right or downward direction. To be specific, a condition in which another object B is to the right of a specific or basic object A satisfies the conditions "left (A)<horizontal center (B)" and "lower (A)≧upper (B)≧upper (A), or upper (A)>upper (B), and simultaneously vertical center (A)≦lower (B)". And a condition in which another object B is below a specific or basic object A satisfies the conditions "vertical center (A)<upper (B)" and "right (B)≧left (A)≧left (B) or right (A)≧left (B)≧left (A)". A concrete explanation of expressions "left (A)", "horizontal center (B)", etc., will be given in the following detailed description of the preferred embodiments of the present invention to be described later.

In a preferred embodiment, the second setting means corresponds to a second step of setting a link in the right or downward direction that has not been set in the first step. Also, the condition used in the second step (the above described second condition) is set by using a less stringent condition than the condition used in the first step. In this embodiment, at the time of setting a right link, it is possible to set a right link not only for an object that satisfies the above described "to the right of" condition, but also for an object "existing in a 30° sector area in a downward right direction" as seen from the object which is the origin. Moreover, if a plurality of objects exist in the same direction in the first step and the second step, a link is set for the object at the shortest distance. In this way, links are fully set in the right and downward directions in the first step and second step.

In another preferred embodiment, the third setting means corresponds to a third step of setting a link to an object existing in an opposite direction to one of the directions set in the above described first step and second step, i.e., in the left and upward directions. Also, the condition used in this third step (the above described third condition) presupposes that a right/downward link has been set in the first step or second step. That is to say, a link is set in the diametrically or 180 degrees opposite direction to the already set right/downward link. Here too, however, if there is a plurality of objects in the same direction, the setting is based on the distances from the specific or basic object to the plurality of other objects.

In a further preferred embodiment, the fourth setting means corresponds to a fourth step of setting a link in the left direction or upward direction that has not been set in the third step. Also, the condition used in the fourth step (the fourth condition) is set by using a less stringent condition than the condition used in the third step. To be specific, at the time of setting a left link, the condition used in the fourth step is "within a 30° sector area in an upward left direction", not "to the left." In this way, links are fully set in the left and upward directions in the third step and fourth step. Thus, all link settings are completed. Setting links in steps, as described above, enables links to be set more flexibly in relation to the object layout than in the case where links are set simply with the list order as an absolute condition, and as a result it is possible to form a link tree that conforms to the wishes of the user.

Also, in cases where the objects have complicated shapes, or the distance varies according to the position at which an object is indicated or represented, it is further desirable to be able to perform position and size conversion for a substitute object for the relevant object, and use the converted numeric values for link setting. For example, there are cases where, because of the length of a character string of an object within a Home Page, line feeds are used to give a plurality of lines when displaying the object on the screen. In this case, conversions of the substitute object position and size are performed, with the positions of the first line and the last line, size, and direction of observation, of the relevant object as parameters. According to such a method, link setting can be performed easily whatever the configuration of the object for which links are to be set.

Moreover, the present invention can also be applied to frames that are frequently used in a Home Page, etc. Links are set in the same way as described above for a frame itself and objects within a frame. It is further preferred for link setting to be performed for objects in frames. Furthermore, at the time of setting links from an object within a frame constituting the origin to an object or objects within another frame, it is further preferable to perform link setting dynamically so that the object of another frame nearest to the origin object at the point in time when the origin object is focused upon according to the scrolling state of the other frame becomes the link destination. Enabling links to be set between frames in this way further improves user convenience.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Embodiment 1

Figure 1:
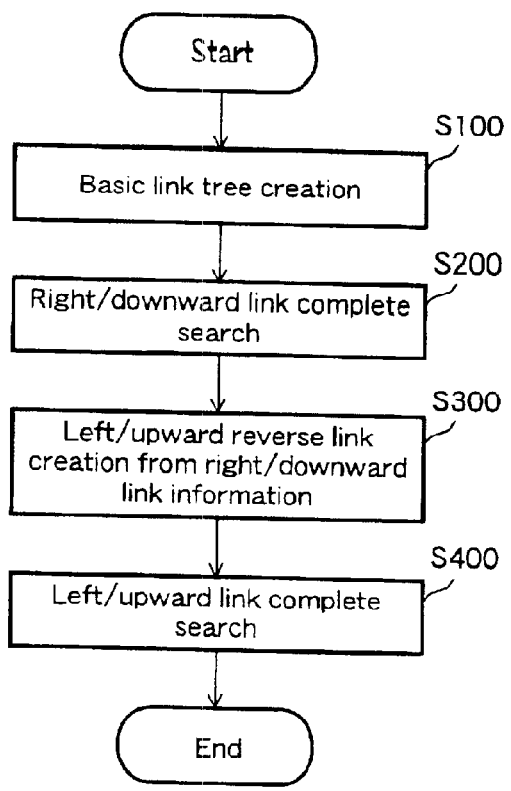
FIG. 1 is a flowchart showing, in steps, a flow of link tree creation processing by a link tree forming apparatus according to a first embodiment of the present invention.
Figure 2:
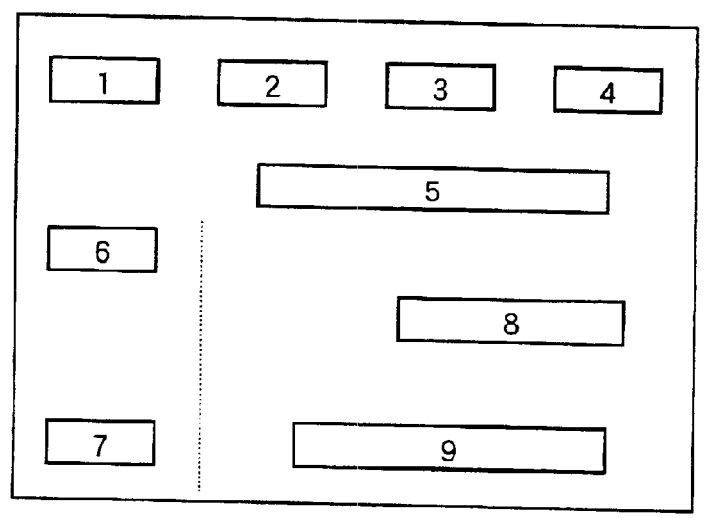
FIG. 2 is a view showing an example of a layout of selectable items before link tree creation in the first embodiment.
Figure 23:
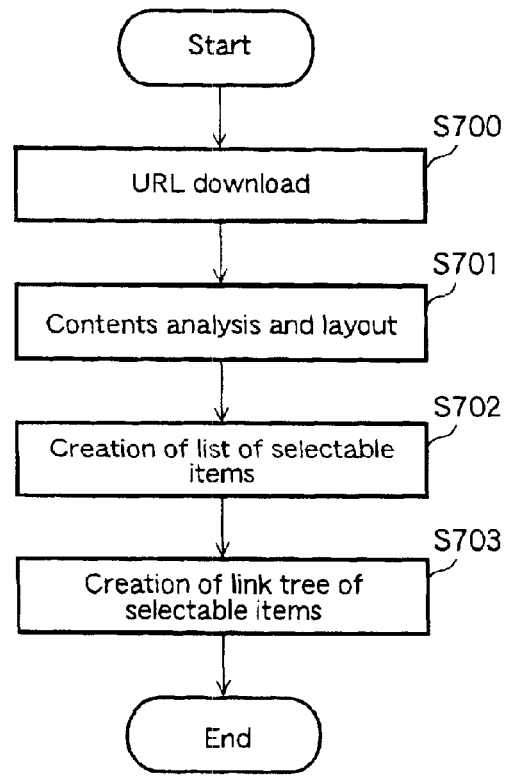
FIG. 23 is a flowchart showing a general list tree creation procedure.
Figure 24:
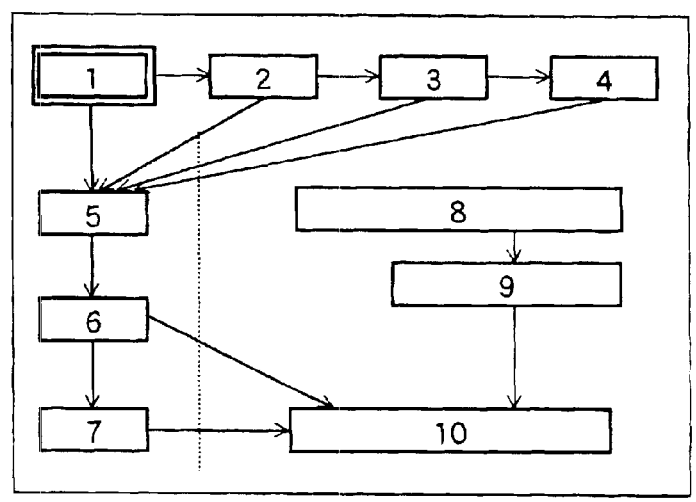
FIG. 24 is a flowchart showing results of link tree formation when a link tree is created by means of a conventional method.

FIG. 1 is a flowchart showing, in steps, the flow of processing for performing link tree creation using a link tree forming apparatus according to a first embodiment of the present invention. The link tree forming apparatus of the present invention is applied to those which do not use a mouse, such as a portable terminal, a WebTV, a set-top box and the like which are adapted to be operated by means of a remote controller only, while serving to form a link tree for focus movement by means of cross-shaped buttons. As shown in FIG. 23, the processing including accessing the Internet from such an apparatus, downloading a URL, analyzing contents contained therein, performing layouts thereof, and creating a list of selectable items, is similar to the conventional method. FIG. 1 briefly describes the flow relating to "link tree setting processing" that differs from the conventional method. FIG. 2 shows a sample layout. The numbers shown in this layout represent a list order. Link setting in this embodiment will be described on the basis of this layout (list). In this embodiment, the laid-out "selectable items" are contents within a Web page, and the contents shown in FIG. 2 are all selectable. Below, this link setting process will be described in detail, following the flow shown in FIG. 1.

In this embodiment, in order to determine visually natural movement destinations, a list of selectable items (contents) is first stored in a storage device such as a memory in the apparatus to which this embodiment is applied, position information on each contents item is read from the list, and a link tree is created using that position information. In creating a link tree, the procedure is divided into four steps as shown in FIG. 1. Right and downward direction movement destinations are determined in the initial two steps, the first step and second step (S100 and S200), and then left and upward direction movement destinations are determined in the next two steps, the third step and fourth step (S300 and S400). In the first step and third step, the link destination is determined on the basis of geometrically stringent conditions in a two-dimensional coordinate system. In the second step and fourth step, the conditions are less stringent than in the first step and third step in order to set as many links as possible. Each step may also be further divided into a number of smaller steps.

Figure 3:
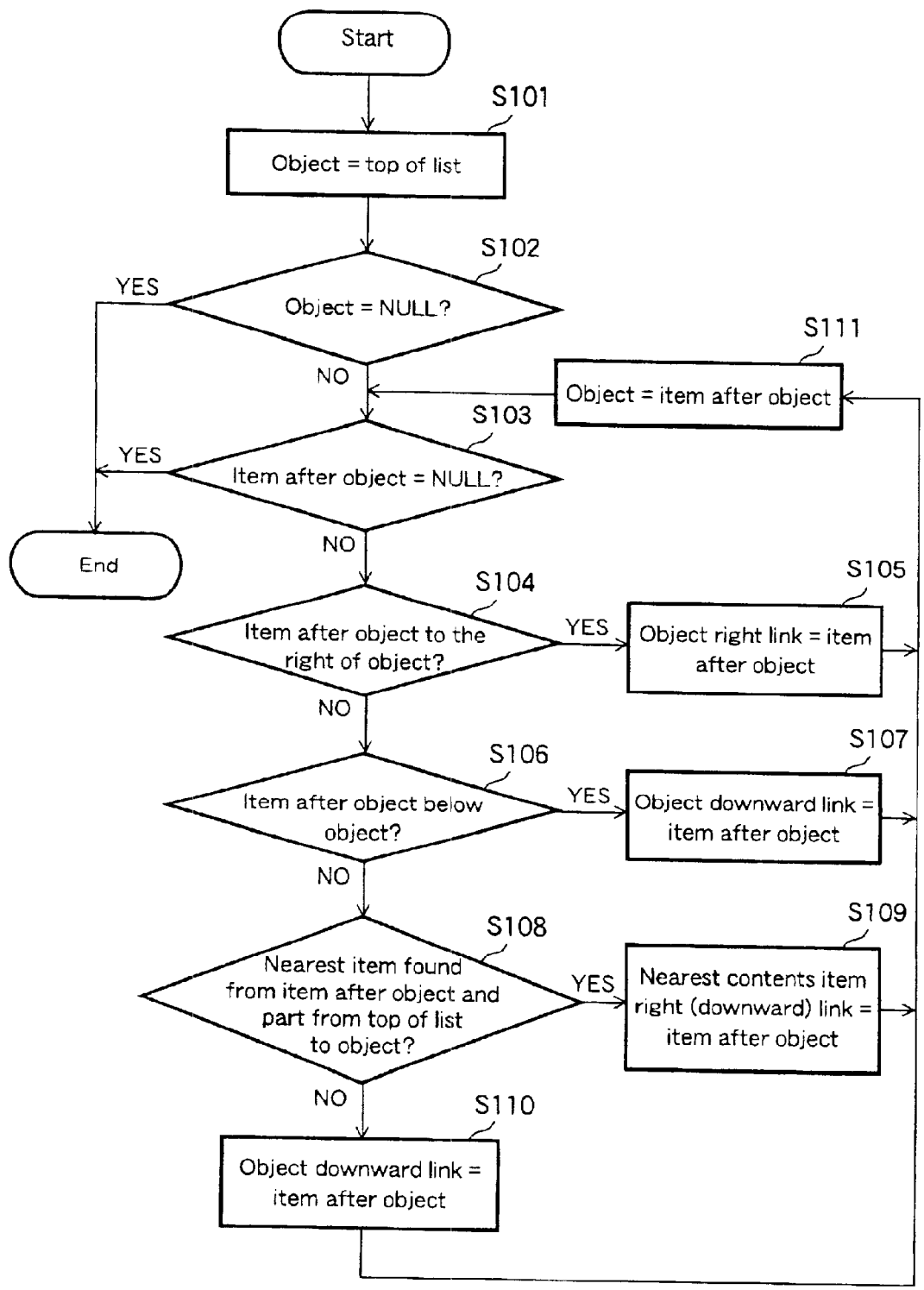
FIG. 3 is a flowchart showing a flow of a first step of "basic link tree creation processing" in the first embodiment.

The processing in each step will be now described in detail. First, basic link tree creation in the first step will be described (S100). In this step, sequential links are set for all contents items, and basically, a basic link tree is formed by determining the direction in which a link is to be made from the item for which a link is being set (called "object" below) to the next contents item (called "item after object" below) following the "object" on the list. The processing in this step is divided into three smaller steps, called right link search, downward link search, and near link search. If either a right or downward direction link is determined during the processing, processing for that "object" is terminated at that point, and link setting is started for the next "object" on the list. If the type of link from "object" to "item after object" is not determined even after executing the above described third step processing, a downward link is set forcibly from "object" to "item after object" in order to ensure linkage of all the contents. FIG. 3 is a flowchart showing the basic link tree creation processing flow in detail, and the above described processing will be described below by using this flowchart.

Here, contents are assigned sequentially to "object" using "object" as a variable, and links are set for the contents items one by one. When contents item m is assigned to "object", it is expressed as "object (m)". First, the top of the list is assigned to "object" (S101). In this embodiment, contents item (1) is assigned first. Next, it is determined whether or not "object" is NULL (S102). If "object" is NULL (S102, YES), it is determined that there is no contents item for which a link is to be set, and this processing is terminated. If "object" is not NULL in S102 (S102, NO), it is determined whether or not "item after object" is NULL (S103). If "item after object" is NULL (S103, YES), it is determined that links have been set as far as the end of the list (in this embodiment, 9), and this processing is terminated. If "item after object" is not NULL (S103, NO), it is next determined whether or not "item after object" is to the right of "object" (S104).

Figure 4A:
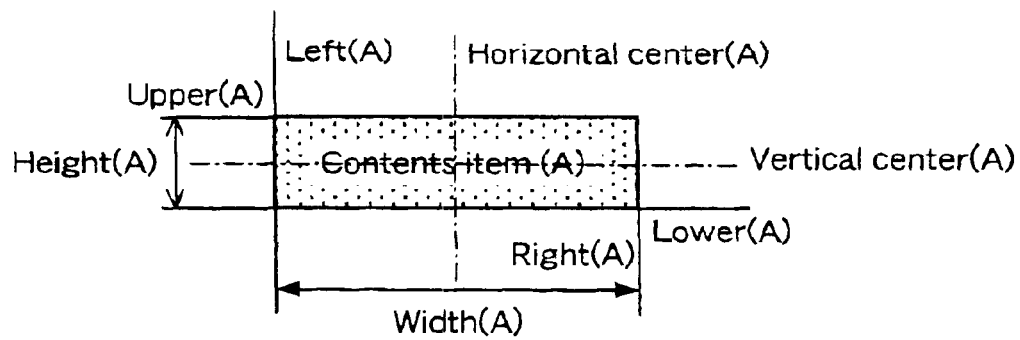
FIGS. 4A through 4C are views showing a definition of descriptions of contents size and position and a definition of relative positions between contents in the first embodiment.

In this step, "to the right of object" means a case where the following conditions are satisfied. First, as shown in FIG. 4A, if there is a contents item (A) that has a certain height and width, the upper side is expressed as upper (A), the lower side as lower (A), the left side as left (A), and the right side as right (A). Also, the center of the width is expressed as vertical center (A), and the center of the height as horizontal center (A). Using this notation, an example of the conditions for (B) being to the right of (A) is shown below.

| Condition 1: | Left (A) < horizontal center (B) and |
|---|---|
| Condition 2: | Lower (A) $\geq$ upper (B) $\geq$ upper (A) or upper (A) > upper (B) and simultaneously vertical center (A) $\leq$ lower (B) |

Figure 4B:
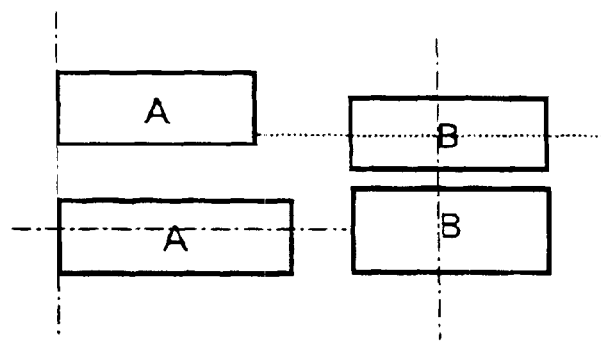

FIG. 4B shows an example of a case where the above described conditions are satisfied: that is, a case where "(B) is to the right of (A)". In comparisons within the above described conditions, values in the horizontal direction are progressively smaller toward the left, and values in the vertical direction are progressively smaller upward.

As a concrete example, a case will be described in which "object" is (1). In this case, "item after object" is (2), and therefore it is determined whether (2) is to the right of (1). In FIG. 2, left (1)<horizontal center (2), and the condition lower (1)$\geq$upper (2)$\geq$upper (1) is satisfied, so (2) is determined to be to the right of (1). Therefore the result of S104 is YES, and the right link destination of object (1) is set as item after object (2) (S105). Next, "item after object" is assigned to "object" (S111). If "object" is (1), (2), which is "item after object", is assigned. Then, links are set from S103 in the same way as described above. As shown in FIG. 2, up to object (3) a right link is set in all cases for "item after object".

Next, when the link destination from object (4) is determined, since "item after object" is (5), the right link conditions are not satisfied (S104, NO). It is then determined whether or not item after object (5) is below object (4) (S106). In this step, "below object" means a case where the following conditions are satisfied. Using the notation in FIG. 4A, sample conditions for (B) being below (A) are shown below.

| Condition 1: | Vertical center (A) < upper (B) and |
|---|---|
| Condition 2: | Right (B) $\geq$ left (A) $\geq$ left (B) or right (A) $\geq$ left (B) $\geq$ left (A) |

Figure 4C:
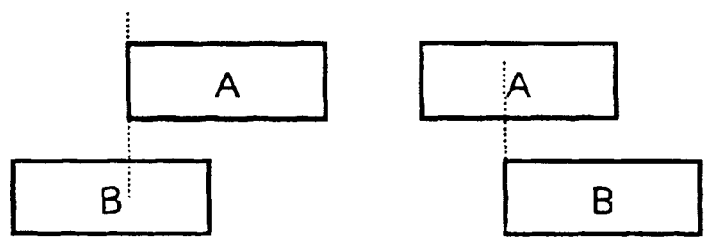

FIG. 4C shows an example of a case where the above described conditions are satisfied: that is, a case where "(B) is below (A)."

With regard to object (4) and item after object (5), vertical center (4)<upper (5), and the condition right (5)$\geq$left (4)$\geq$left (5) is satisfied, so (5) is determined to be below (4). Therefore, the result of S106 is YES, and the downward link destination of object (4) is set as item after object (5) (S107). Next, "item after object" is assigned to "object" (S111). If "object" is (4), (5), which is "item after object", is assigned. Then, links are set from S103 in the same way as described above. As shown in FIG. 2, a downward link is set for "item after object" for object (4), object (6), and object (8).

Next, when the link destination from object (5) is determined, since "item after object" is (6), as can be seen from the drawing the right link and downward link conditions are not satisfied (S104, NO and S106, NO). And in the case of object (7), also, conditions are similarly not satisfied with respect to item after object (8). Therefore, a near item link search is performed (S108). In S108, to be specific, if "object" is (5), the item nearest item after object (6) from among the items from the top of the list to the object (from 1 to 5) is searched for. Details of the processing flow in S108 are shown in FIG. 5.

Figure 5:
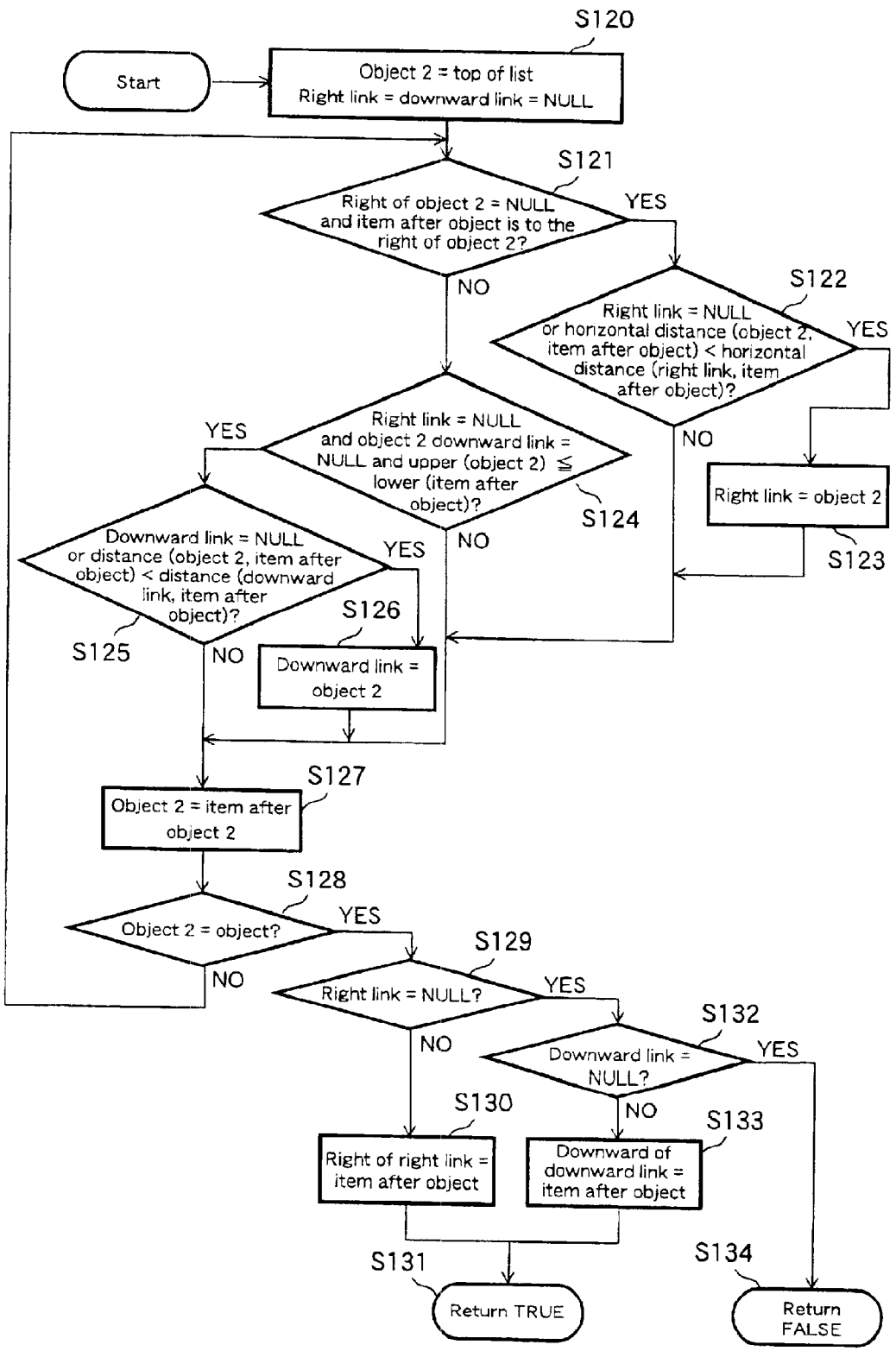
FIG. 5 is a flowchart showing a flow of processing to search for the item with a shortest distance from each one within a range of from a top item to an object in a list to an item after an object in the first step in the first embodiment.

The terms "horizontal distance" and "distance" used in the flowchart in FIG. 5 are defined as follows.

Distance $(A, B) = \{left (A) - left (B)\}^2 + \{upper (A) - upper (B)\}^2$

Horizontal distance $(A, B) = $ absolute value of $\{right (A) - right (B)\}$

Distance (A, B) should be expressed as the square root of the right side, but is defined here as described above since only a size comparison is necessary.

Here, verification proceeds for each item, one by one, from the top of the list to the object, and therefore a new variable "object 2" is provided separately from "object". When contents item m is assigned to "object 2", it is expressed as object 2 (m). First, the top of the list is assigned to "object 2". In this embodiment, (1) is assigned. A candidate for a right link to "item after object" is designated "right link" and a candidate for a downward link to "item after object" is designated "downward link", and initially NULL is set for "right link" and "downward link" (S120).

Next, it is determined whether or not the "object 2" right link destination is NULL and "item after object" is to the right of "object 2" (S121). If the result of S121 is YES, it is determined that "item after object" is to the right of "object 2", and then verification is performed as to whether or not "item after object" should be set as "right link" of "object 2" (S122). In S122, it is determined whether or not "right link" is NULL, or horizontal distance (object 2, item after object) <horizontal distance (right link, item after object). If either condition is satisfied (S122, YES), "object 2" is assigned to "right link" (S123). In this processing, if nothing has been set for "right link", or if a candidate (contents item) has already been assigned to "right link" and the result of comparing the horizontal distance from "item after object" to the already assigned candidate with the horizontal distance from "item after object" to "object 2" is that the horizontal distance from "item after object" to "object 2" is smaller, a right link is set for the time being from the contents item assigned to "object 2" to the contents item assigned to "item after object". As all items from the start of the links to the object are assigned and verified one by one for object 2, "right link" is not confirmed until verification is completed for all items.

If the result of S121 is NO, verification is performed as to whether or not a downward link can be set. First, it is determined whether or not all the following conditions are satisfied: "right link" is NULL, and "object 2" downward link destination is NULL, and upper (object 2)$\leq$lower (item after object) (S124). If all the conditions are satisfied here (S124, YES), "item after object" is determined to be in a downward direction from "object 2", and verification is then performed as to whether or not "item after object" should be set as "downward link" of "object 2" (S125). In S125, it is determined whether or not "downward link" is NULL, or distance (object 2, item after object)<distance (downward link, item after object). If either condition is satisfied (S125, YES), "object 2" is assigned to "downward link" (S126). In this processing, if nothing has been set for "downward link", or if a candidate has already been assigned to "downward link" and the result of comparing the distance from "item after object" to the already assigned candidate with the distance from "item after object" to "object 2" is that the distance from "item after object" to "object 2" is smaller, a downward link is set, for the time being, from the contents item assigned to "object 2" to the contents item assigned to "item after object". As with the above described right link, as all items from the start of the links to "object" are assigned and verified one by one for "object 2", "downward link" is not confirmed until verification is completed for all items.

If the results of S122, S124, and S125 are all NO, or if "object 2" is assigned to "right link" or "object 2" is assigned to "downward link", the contents item after "object 2" is assigned to "object 2" (S127). Then, a check is performed as to whether or not "object 2" after assignment is "object" (S128), and if it is not "object" (S128, NO), link checking is performed again for the relevant "object 2" in the same way as described above. If "object 2" after assignment is "object" (S128, YES), verification is taken as having been completed for all items, and at this point the contents item assigned to "right link" or "downward link" is set as a link destination. If "right link" is not NULL (S129, NO), TRUE is returned (S131) as a right link is set for "item after object" from "right link" (S130). If "right link" is NULL (S129, YES) and "downward link" is not NULL (S132, NO), TRUE is returned (S131) as a downward link is set for "item after object" from "downward link" (S133). If "downward link" is NULL (S132, YES), this means that a nearest contents item to "item after object" was not found, and FALSE is returned (S134).

If TRUE is obtained (S108, YES), in S109 in FIG. 3 the right (or downward) link destination of the contents item nearest "item after object" is set as "item after object". That is to say, either a right link is set for "item after object" from "right link", or a downward link is set for "item after object" from "downward link". Conversely, if FALSE is obtained (S108, NO), this means that an item near "item after object" was not found from the top of the list to "object", and an "object" downward link is forcibly set as "item after object" (S110).

The above described flow will now be described for an actual example. Verification is first performed from (1) for item after object (6). As a right link of object 2 (1) has already been set in S104 in FIG. 3 and is not NULL, the result of S121 is NO. Next, in S124, since "right link" is NULL and a downward link of object 2 (1) has not yet been set, and moreover (6) is below object 2 (1), the result of S124 is YES. Then, since "downward link" is NULL in S125, the result of S125 is YES, and object 2 (1) is assigned to "downward link".

Next, (2) is assigned to "object 2" and verification is carried out in the same way as described above. For (2), the flow up to S125 is the same as for (1), but since (1) has already been assigned to "downward link", it is determined whether or not object 2 (2) should be newly assigned to "downward link" by comparing the distances from (1) and (2) to item after object (6). As can be seen from FIG. 2, distance (2, 6)>distance (1, 6) (S125, NO), and therefore the downward link is left unchanged at (1). Next, (3) and (4) are assigned in order to "object 2" and verification is performed in the same way. Since, in the final analysis, distance (1, 6) is the smallest, "downward link" finally remains as (1), TRUE is returned in S131, and a setting is made in S109 in FIG. 3 so that the (1) downward link becomes item after object (6). When "item after object" is (8), also, verification is performed in the same way as described above, and the (5) downward link is set as item after object (8).

Figure 6:
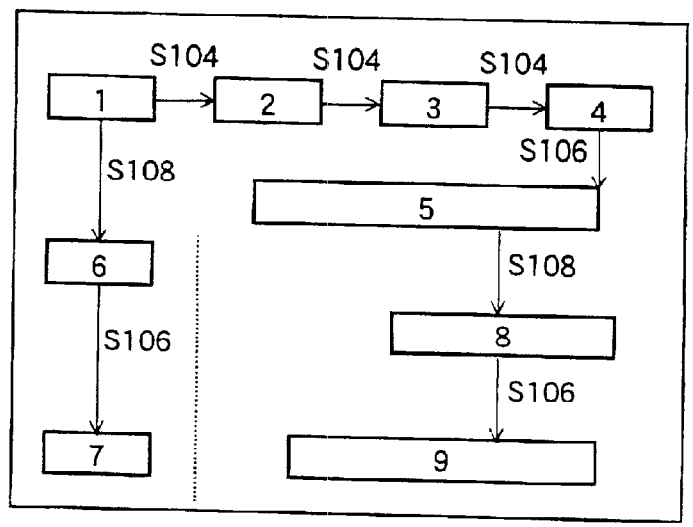
FIG. 6 is a view showing processing results of the first step in the first embodiment.

As described above, a basic link tree is formed in the first step. FIG. 6 shows an example of the result of basic tree formation. The arrows shown in this drawing are the links set in this step.

Figure 7:
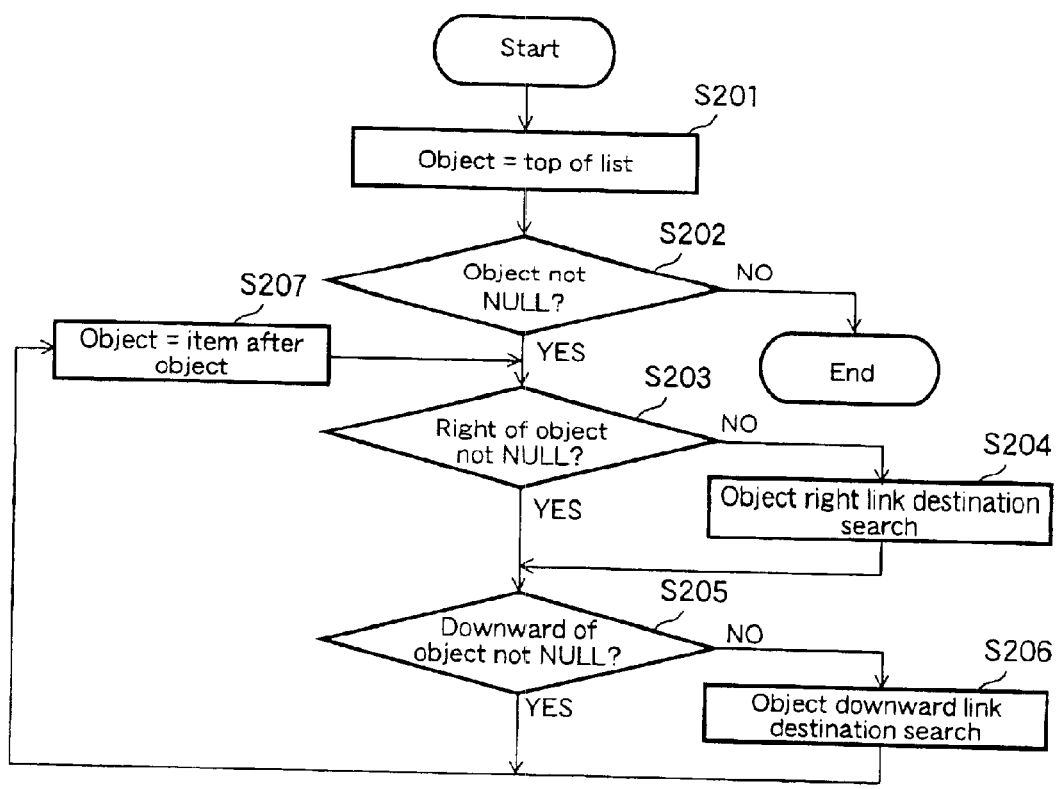
FIG. 7 is a flowchart showing a flow of a second step of "right/downward link tree complete creation processing" in the first embodiment.

Next, a description will be given of link tree creation processing by means of a complete search for right and downward links (S200) in the second step. In this step, the optimum right link destination or downward link destination is determined from contents in the list for each contents item for which a right link or downward link has not yet been determined in the first step. FIG. 7 is a flowchart showing the detailed processing flow for complete creation of right and downward links, and the above described processing will be described below using this flowchart.

Figure 8:
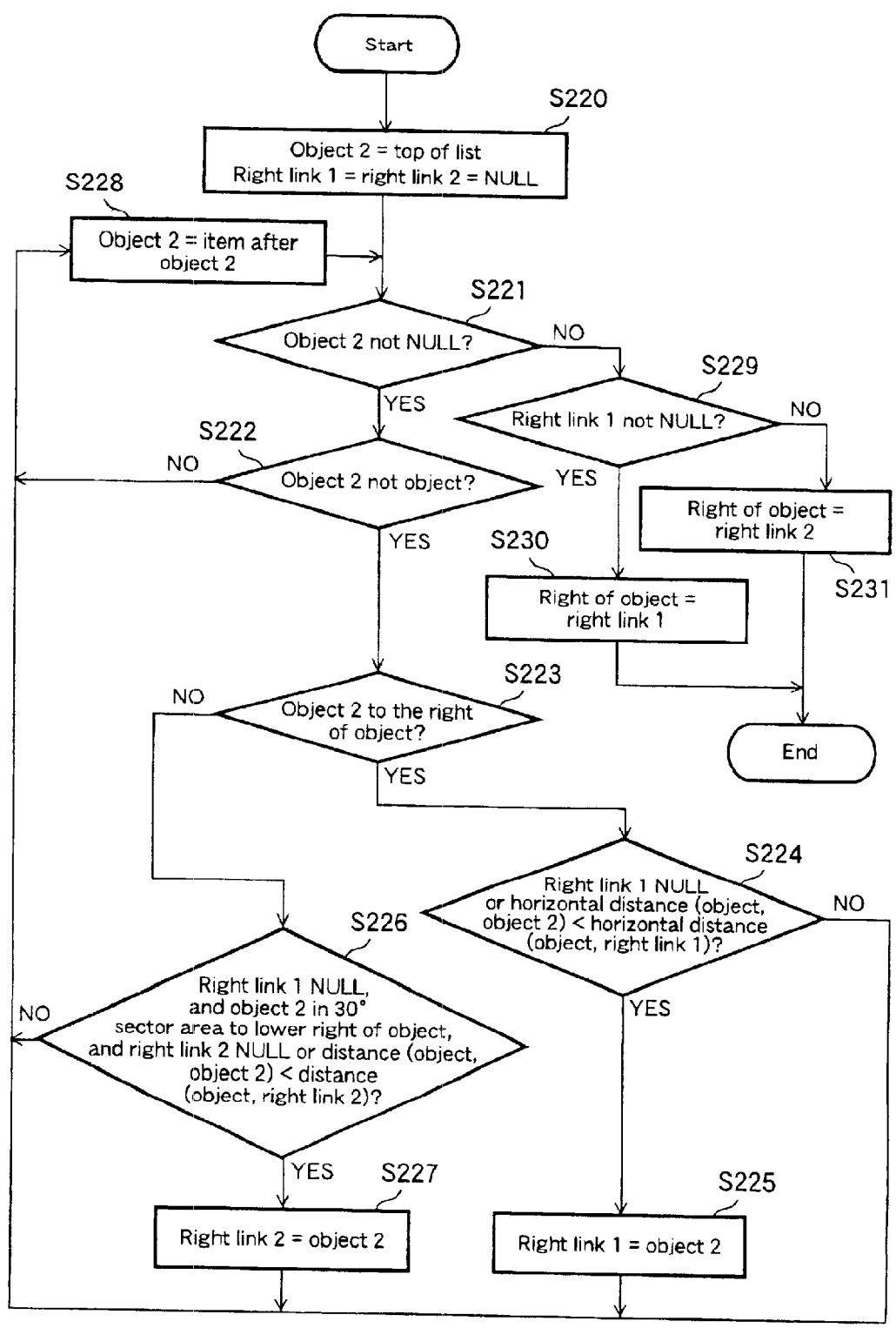
FIG. 8 is a flowchart showing in detail a right link destination search processing within the second step in the first embodiment.

First, the top of the list is assigned to "object" (S201). In this embodiment, (1) is assigned first. Next, it is determined whether or not "object" is NULL (S202). If "object" is NULL (S202, NO), it is determined that there is no contents item for which a link is to be set, and this processing is terminated. If "object" is not NULL in S202 (S202, YES), it is then determined whether or not the right link destination of "object" is NULL (S203). If the right link destination of "object" is NULL (S203, NO), it is determined that a right link has not yet been set, and an "object" right link destination search is performed (S204). In this embodiment, as shown in FIG. 6, a right link destination has not been set for (4) through (9), so S204 processing is executed. FIG. 8 is a flowchart showing the processing in S204 in detail. Right link destination search processing will be described below using this flowchart.

Figure 9:
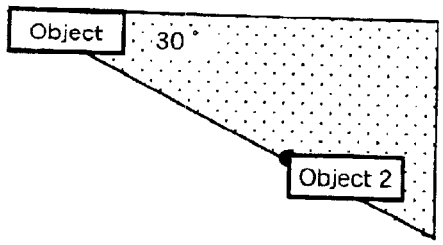
FIG. 9 is a view showing an example of a condition for a right link used in right link destination search processing within the second step in the first embodiment.

For "right link 1" in the flowchart in FIG. 8 an item is assigned that satisfies the condition of being to the right of the object, and for "right link 2" an item is assigned that satisfies the condition of being in a 30° sector area to the lower right of the object. As shown in FIG. 9, not only the "to the right of" condition (right link 1) but also the "within a 30° sector area in the lower right direction" condition (right link 2) is used in right link search processing. If there are a plurality of contents items that satisfy the respective conditions, the distances from "object" to these are compared, and the item at the shortest distance is selected. If a contents item that satisfies the "right link 1" condition is found, "right link 2" search processing is suspended and the contents item satisfying the "right link 1" condition is preferentially determined to be the right link destination. As verification proceeds for each item, one by one, from the top of the list to "object", a variable called "object 2" is provided separately from "object".

First, the top of the list (1) is assigned to "object 2". Also, NULL is assigned to "right link 1" and "right link 2" (S220). Next, it is determined whether or not "object 2" is NULL (S221). If "object 2" is not NULL (S221, YES), it is inferred that verification has not been completed for all contents items in the list, and right link search processing is continued. It is then determined whether or not "object 2" is "object" (S222). If "object 2" is "object" (S222, NO), since a right link is never set from "object" to "object" itself, the next contents item is assigned to "object 2" and search processing is continued (S228). If "object 2" is not "object" (S222, YES), it is next determined whether or not "object 2" is to the right of "object" (S223).

In this embodiment, when the right link destination of object (6) is determined, since "object 2" is located above object (6) from (1) to (5), the result of S223 is NO, and S226 processing is executed. In S226, verification is performed as to whether or not conditions are satisfied for making a "right link 2" setting. "Object 2" is assigned to "right link 2" when the following conditions are satisfied.

| | |
|---|---|
| Condition 1: | "Right link 1" is NULL, and |
| Condition 2: | "Object 2" is in a 30° sector area to the lower right of "object", and |
| Condition 3: | "Right link 2" is NULL or distance (object, object 2) < distance (object, right link 2) |

When "object 2" is (1) to (5) or (7), condition 2 is not satisfied (S226, NO), and therefore no assignment is made to "right link 2" and in S228 the next contents item on the list is assigned to "object 2" (S228). In the case of "object 2" (6), the result of S222 is NO, and so similarly "right link 1" and "right link 2" do not change. When "object 2" is (8), it is in a 30° sector area to the lower right of (6) and S226 conditions 1, 2, and 3 are all satisfied (S226, YES), and therefore (8) is assigned to "right link 2" (S227). When "object 2" is (9), as with (1) to (5) and (7), the S226 conditions are not satisfied and therefore "right link 2" does not change. In the distance-related condition of the above described three conditions, if there are a plurality of contents items in a 30° sector area to the lower right of "object", the contents item nearest "object" is made "right link 2".

When verification ends for (9), since "object 2" is NULL (S221, NO) as a result of S228 processing, S229 processing is executed. In S229, if "right link 1 " is not NULL (S229, YES), "right link 1" is given priority over "right link 2" and the contents item assigned to "right link 1" is set as the right link destination of "object" (S230). Also, if "right link 1" is NULL in S229 (S229, NO), the contents item assigned to "right link 2" is set as the right link destination of "object" (S231). As described above, when "object" is (6), the right link destination is (8) assigned to "right link 2".

As another concrete example, the right link destination determination process will now be briefly described for the case where "object" is (7). When "object 2" is (1) to (6) or (8), the S226 conditions are not satisfied and therefore nothing is assigned to "right link 2". However, when "object 2" is (9), since it is to the right of (7) the result of S223 is YES, and since, of S224 conditions:

| | |
|---|---|
| Conditions | "Right link 1" is NULL, or horizontal distance (object, object 2) < horizontal distance (object, right link 1) | the condition "right link 1" is NULL is satisfied, after S228 "object 2" becomes NULL and (9) is assigned to "right link 1". As (9) is the last item on the list, S229 processing is executed, and also, since "right link 1" is not NULL in S229 (S229, YES), the right link destination of object (7) is set as (9) assigned to "right link 1" (S230). In the distance-related condition of the above described conditions, if there are a plurality of contents items to the right of "object", the contents item nearest "object" is made "right link 1".

There are also cases where nothing is assigned to either "right link 1" or "right link 2" because the conditions are not satisfied at all. For example, the right link remains as NULL and nothing is set for (5), (8), and (9) in FIG. 6.

Figure 10:
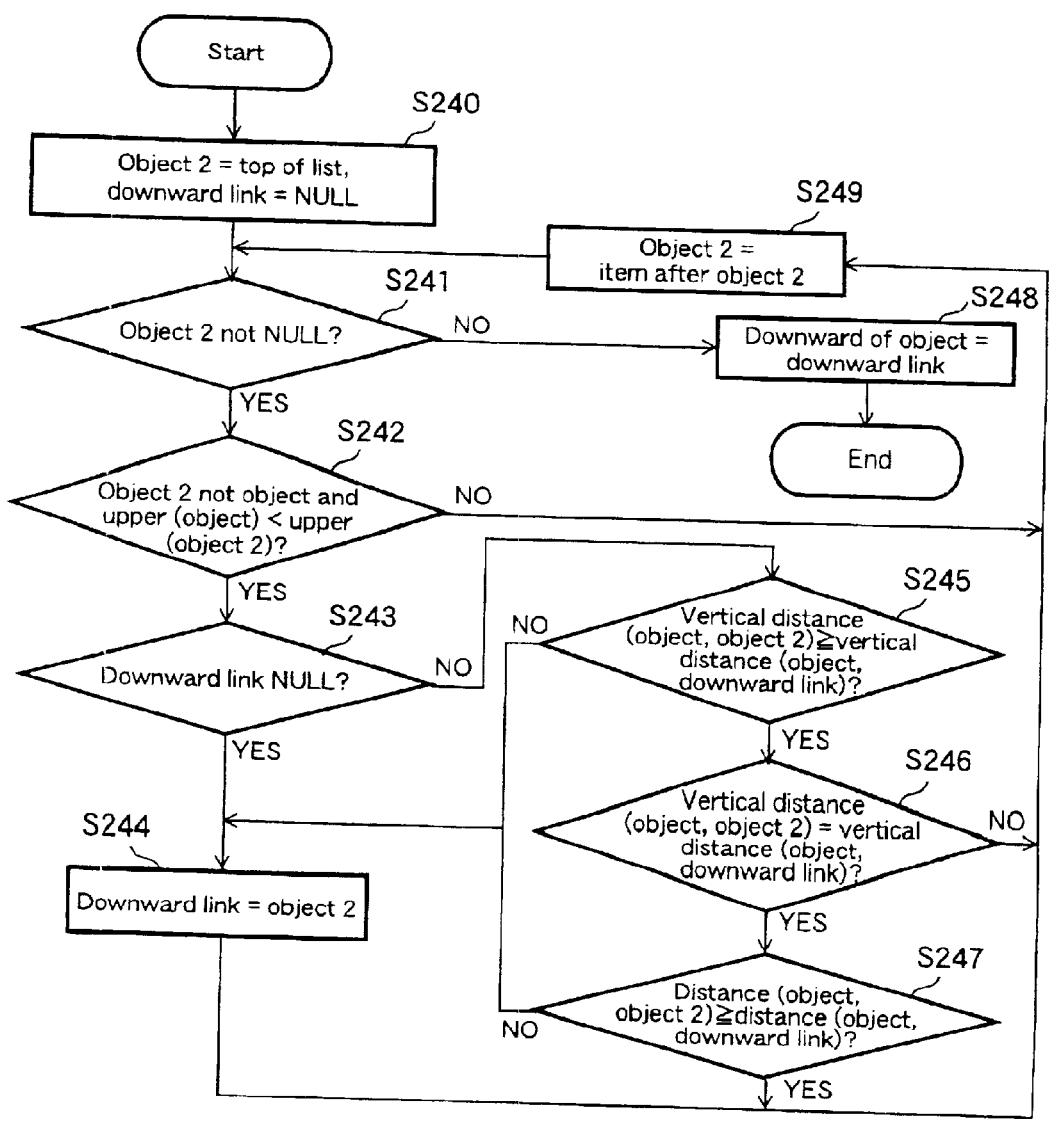
FIG. 10 is a flowchart showing in detail a downward link destination search processing within the second step in the first embodiment.

When S204 processing in FIG. 7 ends, a check is then performed as to the presence/absence of a downward link for "object" in S205. S205 is also performed if the "object" right link destination is not NULL in S203 (S203, YES). Here, if the "object" downward link destination is NULL (S205, NO), it is determined that a downward link has not yet been set, and an "object" downward link destination search is performed (S206). FIG. 10 is a flowchart showing the processing in S206 in detail. Downward link destination search processing will be described below by using this flowchart.

In the flowchart in FIG. 10, "downward link" indicates a candidate for the "object" downward link destination. In this processing, viewed from "object", the contents item that satisfies the condition of being lower than "object" in the list and has the shortest vertical distance to "object" is selected and made the downward link destination. If there are a plurality of contents items for which the vertical distance value is the same, a decision is made by comparing the distances (squares of absolute distances).

To describe the above processing following the flowchart, the top of the list (1) is first assigned to "object 2". Also, NULL is assigned to "downward link" (S240). Next, it is determined whether or not "object 2" is NULL (S241). If "object 2" is not NULL (S241, YES), it is inferred that verification has not been completed for all contents items in the list, and downward link search processing is continued. It is then determined whether or not "object 2" is "object" and whether or not "object 2" is below "object" (S242). If "object 2" is "object" (S242, NO), since a downward link is never set from "object" to "object" itself, the next contents item after "object 2" is assigned to "object 2" (S249) and search processing is continued. If "object 2" is not "object" in S242 and upper (object)<upper (object 2) (S242, YES), it is then determined whether or not "downward link" is NULL (S243). If it is NULL (S243, YES), "object 2" is assigned to "downward link" (S244). If it is not NULL (S243, NO), it is inferred that there is a plurality of downward-linkable contents items, and verification in S245 to S247 is performed to set the contents item at the shortest distance from "object" from among these as the downward link.

First, vertical distance (object, object 2) and vertical distance (object, downward link) are compared in S245. If the condition vertical distance (object, object 2)≧vertical distance (object, downward link) is not true (S245, NO), "object 2" is determined to be nearer "object" than the candidate assigned to "downward link", and "object 2" is assigned to "downward link" (S244). If vertical distance (object, object 2)≧vertical distance (object, downward link) (S245, YES), a check is then carried out as to whether or not vertical distance (object, object 2)=vertical distance (object, downward link). If the condition vertical distance (object, object 2)=vertical distance (object, downward link) is not true (S246, NO), the distance from the candidate assigned to "downward link" is determined to be smaller than that of "object 2", and the candidate assigned to "downward link" is kept unchanged. If vertical distance (object, object 2)=vertical distance (object, downward link) (S246, YES), distance, not vertical distance, is then verified. If distance (object, object 2)≧distance (object, downward link) (S247, YES), the candidate assigned to "downward link" is kept, but if the condition distance (object, object 2)≧distance (object, downward link) is not true (S247, NO), "object 2" is determined to be nearer "object" than the candidate assigned to "downward link", and "object 2" is assigned to "downward link" (S244).

After S244, or if the result of S246 is NO or the result of S247 is YES, the next contents item after "object 2" is assigned to "object 2" (S249), and the downward link search is continued as described above. When "object 2" (9) verification ends, "object 2" becomes NULL (S241, NO), and therefore searching is terminated for all contents items and the candidate finally assigned to "downward link" is determined as the downward link destination of "object" (S248).

As a concrete example, the case where the downward links of contents items (2) and (3) are set in FIG. 6 will now be described in detail, following the above described processing flow. When "object" is (2), (1) to (9) are assigned successively to "object 2", and verification as to whether or not a downward link is to be made is carried out. At the point at which "object 2" becomes (5), the S242 and S243 conditions are satisfied, and therefore (5) is assigned to "downward link" (S244). In this example, there are no items other than (5) for which upper (object)<upper (object 2), and therefore the candidate (5) assigned to "downward link" is determined as the downward link destination of object (2) (S248).

When "object" is (3), also, (1) to (9) are assigned successively to "object 2" in the same way, and verification as to whether or not a downward link is to be made is carried out. As shown in FIG. 6, at the point at which "object 2" becomes (5), the S242 and S243 conditions are satisfied, and therefore (5) is assigned to "downward link" (S244). Then, when "object 2" becomes (8), the S242 conditions are satisfied but "downward link" is not NULL (S243, NO), so (5) and (8) are compared. In S245, vertical distance (2, 8)≧vertical distance (2, 5) (S245, YES) and the condition vertical distance (2, 8)=vertical distance (2, 5) is not true (S246, NO), and therefore "downward link" remains as (5). When "object 2" is (9), also, as with (8), vertical distance (2, 9)≧vertical distance (2, 5) (S245, YES) and the condition vertical distance (2,9)=vertical distance (2, 5) is not true (S246, NO), and therefore "downward link" is kept unchanged as (5). As a result, the downward link destination of (3) is (5).

There are also cases where nothing is assigned to "downward link" because the conditions are not satisfied at all. For example, "downward link" remains as NULL and nothing is set for (7) and (9) in FIG. 6.

Figure 11:
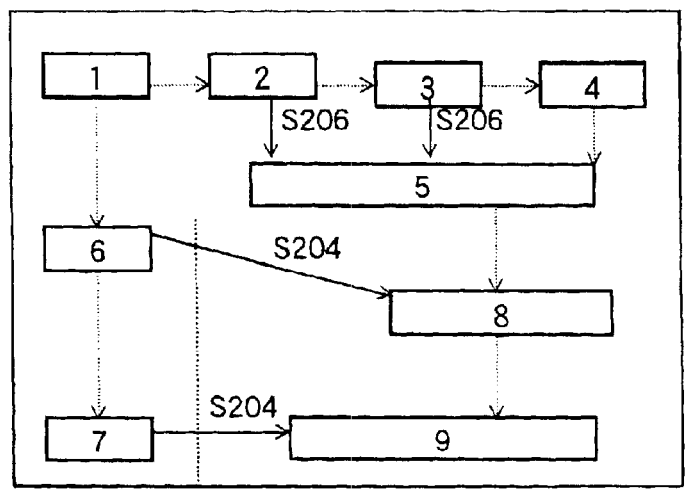
FIG. 11 is a view showing processing results of the second step in the embodiment.

When S206 processing in FIG. 7 ends, or if the object downward link is not NULL in S205 (S205, YES), "item after object" is assigned to "object" (S207), and the processing from S203 to S206 is repeated. As a result, right and downward link settings are completed for all contents items. FIG. 11 shows an example of the results of the second step. In the drawing, arrows shown as dotted lines are links set in the previous step, and arrows shown as solid lines are links set in this step.

Figure 12:
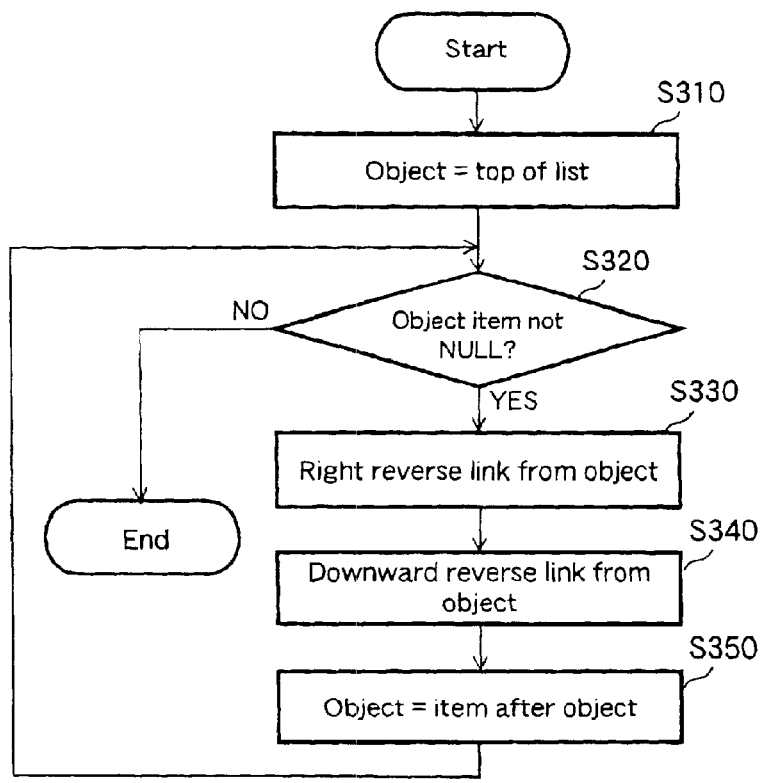
FIG. 12 is a flowchart showing a flow of a third step "left/upward link creation processing" in the first embodiment.

Next, left and upward link creation processing (S300) in the third step will be described. In this step, left and upward link destinations are determined using information on the right and downward link destinations determined in the first step and second step processing. If a right link (or downward link) has been set for a particular "object" from among a plurality of contents items, the one of these at the shortest distance from "object" is selected, and a left link (or upward link) is set from "object" to the selected contents item. FIG. 12 is a flowchart showing the processing flow for left and upward link creation, and the above described processing will be described below using this flowchart.

First, the top of the list is assigned to "object" (S310). In this embodiment, (1) is assigned first. In this step, also, link destination searching is performed in order for all the contents items in the list (in this example, up to (9)). Next, it is determined whether or not "object" is NULL (S320). If "object" is NULL (S320, NO), it is determined that there is no contents item for which a link is to be set, or that links have been set for all contents items, and this processing is terminated.

Figure 13A:
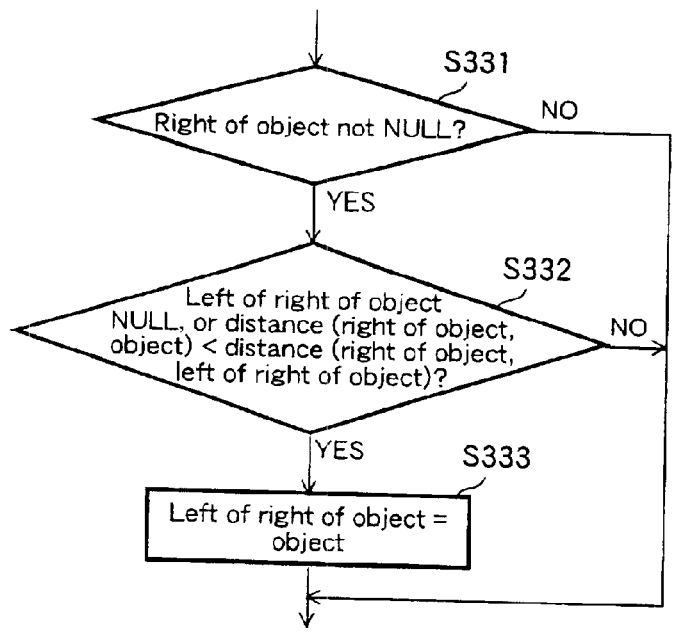
FIGS. 13A and 13B are flowcharts showing details of the left link creation processing and upward link creation processing, respectively, within the third step in the first embodiment.

Next, a right reverse link (that is, a left link) is set from "object" (S330). Details of the processing in S330 are shown in the flowchart in FIG. 13A. 'Right link destination of object' is expressed as "right of object" and 'left link destination of "right of object"' as "left of right of object". First, it is determined whether or not "right of object" is NULL (S331). If it is NULL (S331, NO), since a reverse link (left link) is not set for an item for which a right link has not been set, left link setting is not performed. If "right of object" is not NULL (S331, YES), it is next determined whether or not the following S332 condition is satisfied:

"left of right of object" is NULL, or distance (right of object, object)<distance (right of object, left of right of object)

If the above described condition is satisfied (S332, YES), "object" is assigned to "left of right of object" (S333). If the above described condition is not satisfied, "left of right of object" does not change and S330 processing is terminated.

In the distance-related condition of the above described conditions, if there are a plurality of contents items to the left of "right of object", the item nearest "object" is made the left link destination.

Figure 13B:
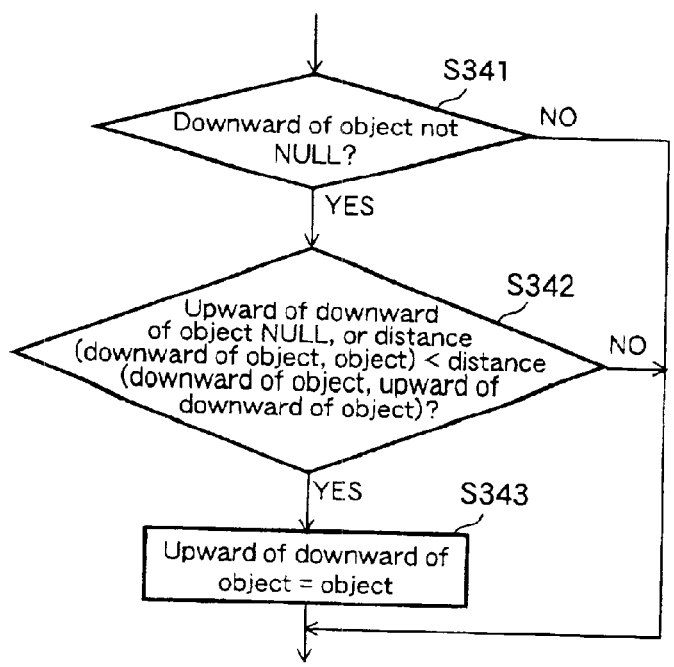

Next, a downward reverse link (that is, upward link) from "object" is set (S340). Details of the processing in S340 are shown in the flowchart in FIG. 13B. 'Downward link destination of object' is expressed as "downward of object" and 'upward link destination of "downward link destination of object"' as "upward of downward of object". First, it is determined whether or not "downward of object" is NULL (S341). If it is NULL (S341, NO), since a reverse link (upward link) is not set for an item for which a downward link has not been set, upward link setting is not performed. If "downward of object" is not NULL (S341, YES), it is next determined whether or not the following S342 condition is satisfied:

"upward of downward of object" is NULL, or

"distance (downward of object, object)<distance (downward of object, upward of downward of object)

If the above described condition is satisfied (S342, YES), "object" is assigned to "upward of downward of object" (S343). If the above described condition is not satisfied, "upward of downward of object" does not change and S340 processing is terminated.

In the distance-related condition of the above described conditions, if there are a plurality of contents items upward of "downward of object", the item nearest "object" is made the upward link destination.

Figure 14:
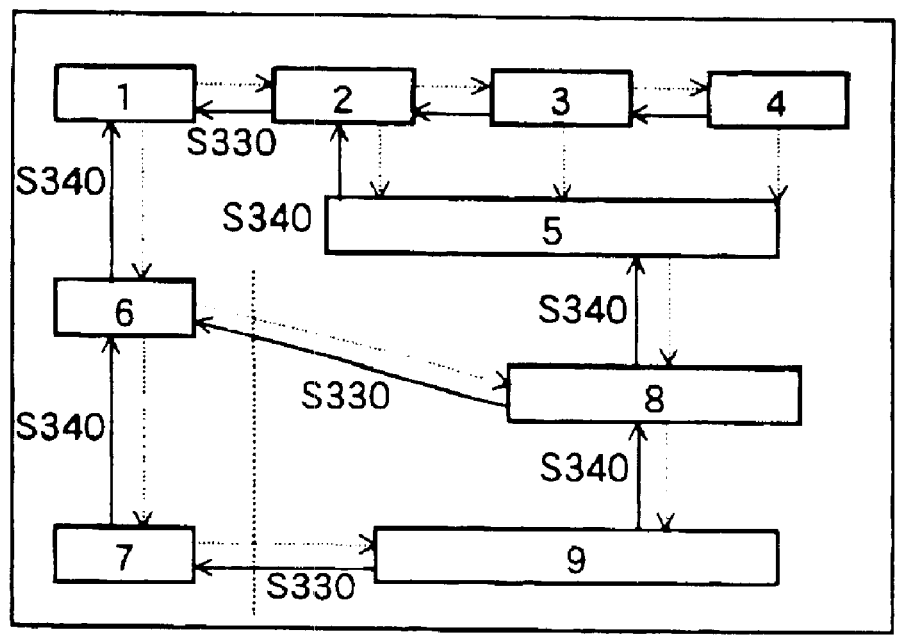
FIG. 14 is a view showing the processing results of the third step in the first embodiment.

After the S330 and S340 processing, the next contents item is assigned to "object" (S350). By repeating the processing from S320 to S350 in this way up to the end of the list (9), left and upward link destinations are determined. FIG. 14 shows an example of the results of the third step. In the drawing, arrows shown as dotted lines are links set in the first and second steps, and arrows shown as solid lines are links set in this step.

Figure 15:
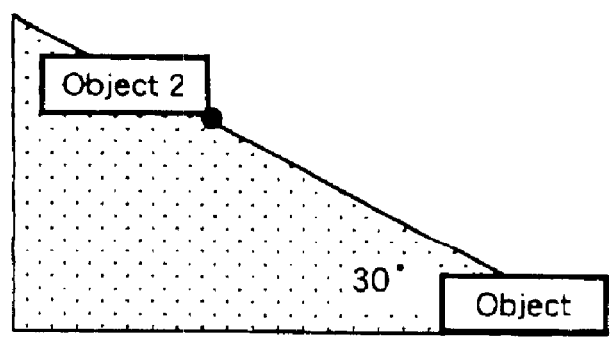
FIG. 15 is a view showing an example of the condition for a left link used in left link destination search processing within a fourth step in the first embodiment.
Figure 16:
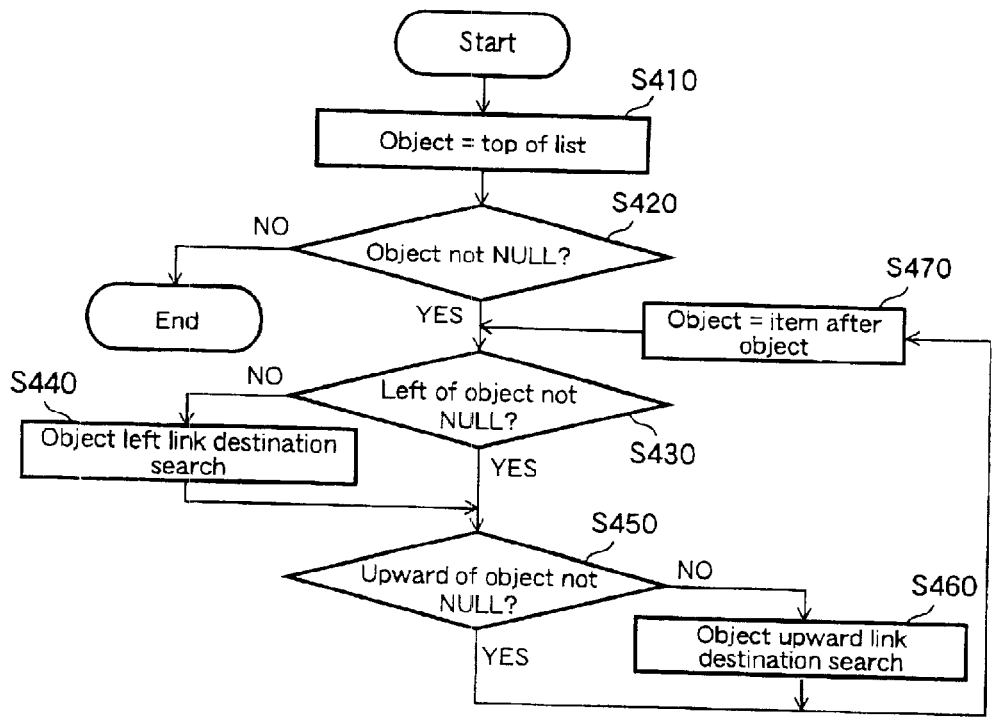
FIG. 16 is a flowchart showing the flow of the fourth step "left/upward link tree complete creation processing" in the first embodiment.
Figure 17:
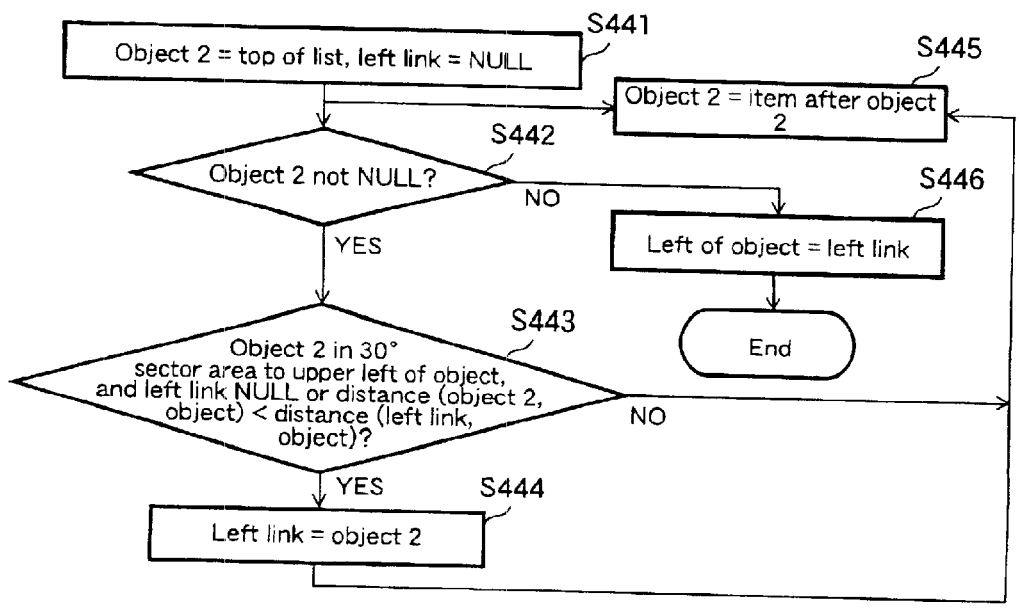
FIG. 17 is a flowchart showing in detail a left link destination search processing within the fourth step in the first embodiment.

Next, left and upward link complete search processing (S400) in the fourth step will be described. In this step, links are set for contents items for which a left link destination or upward link destination has not been determined in the third step processing. For each object, the optimum left link destination or upward link destination is determined from the contents items in the list. In this step, the processing is basically the same as that for right/downward link complete searching in the second step. Link destinations are determined in the left and upward directions instead of the right and downward directions. Also, as shown in FIG. 15, in left link search processing the condition "within a 30° sector area to the upper left" is used, and the condition "to the left of" is not used. FIG. 16 and FIG. 17 are flowcharts showing the detailed processing flow for complete creation of a left and upward link tree, and the above described processing will be described below using these flowcharts. As upward link search processing is in principle the same as downward link search processing, a flowchart for this processing is omitted.

First, in FIG. 16, the top of the list is assigned to "object" (S410). In this embodiment, (1) is assigned first. Next, it is determined whether or not "object" is NULL (S420). If "object" is NULL (S420, NO), it is determined that there is no contents item for which a link is to be set, or that links have been set for all contents items, and this processing is terminated.

If "object" is not NULL in S420 (S420, YES), it is then determined whether or not the left link destination of "object" is NULL (S430). If the left link destination of "object" is NULL (S430, NO), it is determined that a left link has not yet been set, and an "object" left link destination search is performed (S440). In this embodiment, as shown in FIG. 14, a left link destination has not been set for (5), so S440 processing is executed when (5) is assigned to "object". FIG. 17 is a flowchart showing the processing in S440 in detail. Left link destination search processing will be described below by using this flowchart.

In this processing, also, verification proceeds for each item, one by one, from the top of the list to the object, and therefore a variable called "object 2" is provided separately from "object". First, the top of the list (1) is assigned to "object 2". Also, NULL is assigned to "left link" (S441). Next, it is determined whether or not "object 2" is NULL (S442). If "object 2" is not NULL (S442, YES), it is inferred that verification has not been completed for all contents items in the list, and left link search processing is continued. In S443 it is determined whether or not the conditions for left link setting are satisfied (S443). If either of the conditions shown below is satisfied (S443, YES), "object 2" is assigned to "left link" (S444).

| | |
|---|---|
| Condition A: | "Left link" is NULL, and "object 2" is in a 30° sector area to the upper left of "object". |
| Condition B: | Distance (object 2, object) < distance (left link, object) |

In condition B above, if there are a plurality of contents items in a 30° sector area to the upper right of "object", the contents item nearest "object" is made the left link destination.

When S444 processing ends, or if neither of the above described S443 conditions is satisfied (S443, NO), the next contents item is assigned to "object 2" (S445), and the above described processing is repeated. If "object 2" is NULL (S442, NO), it is determined that a left link search has been performed for all the contents items in the list for the relevant object, and the item finally assigned to "left link" is set as the left link destination of "object" (S446).

In this embodiment, when "object" is (5) and "object 2" is (1), condition A above is satisfied and therefore (1) is assigned to "left link". When object 2 is (2) to (9), neither of the above conditions is satisfied, and therefore, finally, (1) is the left link destination of (5).

Figure 18:
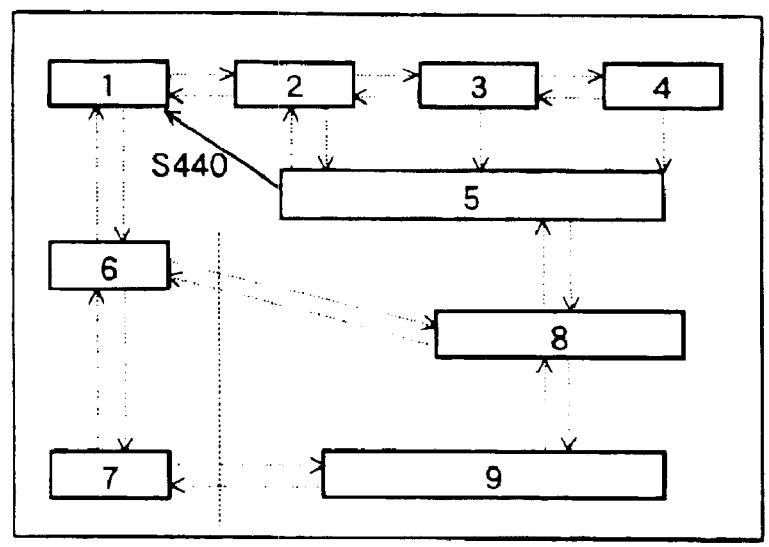
FIG. 18 is a view showing the processing results of the fourth step in the first embodiment.

After left link destination searching has been performed in S440, upward link destination searching is carried out. First, it is determined whether or not the upward link of "object" is NULL (S450). If it is NULL (S450, NO), an "object" upward link destination search is carried out in S460. The processing in S460 is similar to that in S206 ("object" downward link destination search) in FIG. 7, and so details will be omitted here. After S460 processing ends, or if the object upward link is not NULL (S450, YES), the next contents item is assigned to "object" (S470), and the processing from S430 to S460 is repeated. By this means, a left and upward and link search is finally carried out for all contents items, and link settings are completed. FIG. 18 shows an example of the results of the fourth step. In the drawing, arrows shown as dotted lines are links set in the first through third steps, and the arrow shown as a solid line is the link set in this step.

Figure 19:
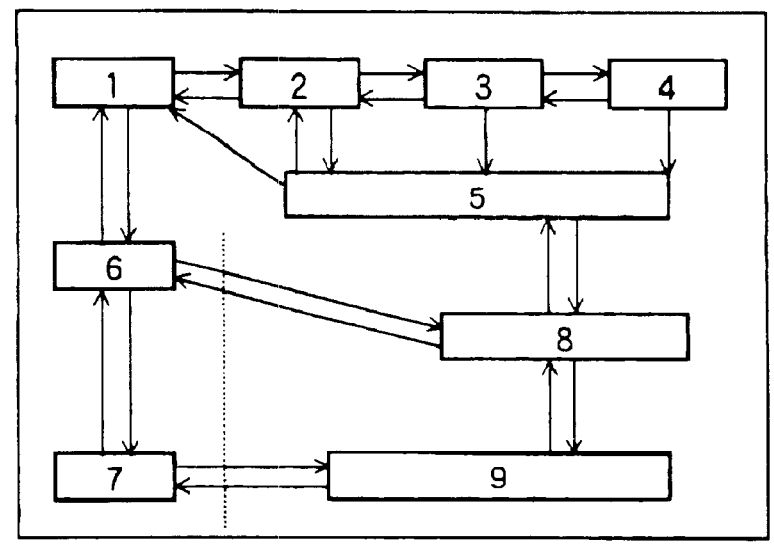
FIG. 19 is a view showing an example of a link tree created by processing from the first step to fourth step in the first embodiment.

At this point, the processing of all steps ends and the overall link tree is completed as shown in FIG. 19. As position information and distances are used in link setting, and link setting is carried out in steps, as described above, a visually natural link tree is created. In FIG. 19, for example, with the conventional method a downward link is made forcibly from (5) to (6), but according to the present invention, a downward link is set from (5) to (8), and focus movement that is visually natural and logical for the user is made possible.

Embodiment 2

Figure 20:
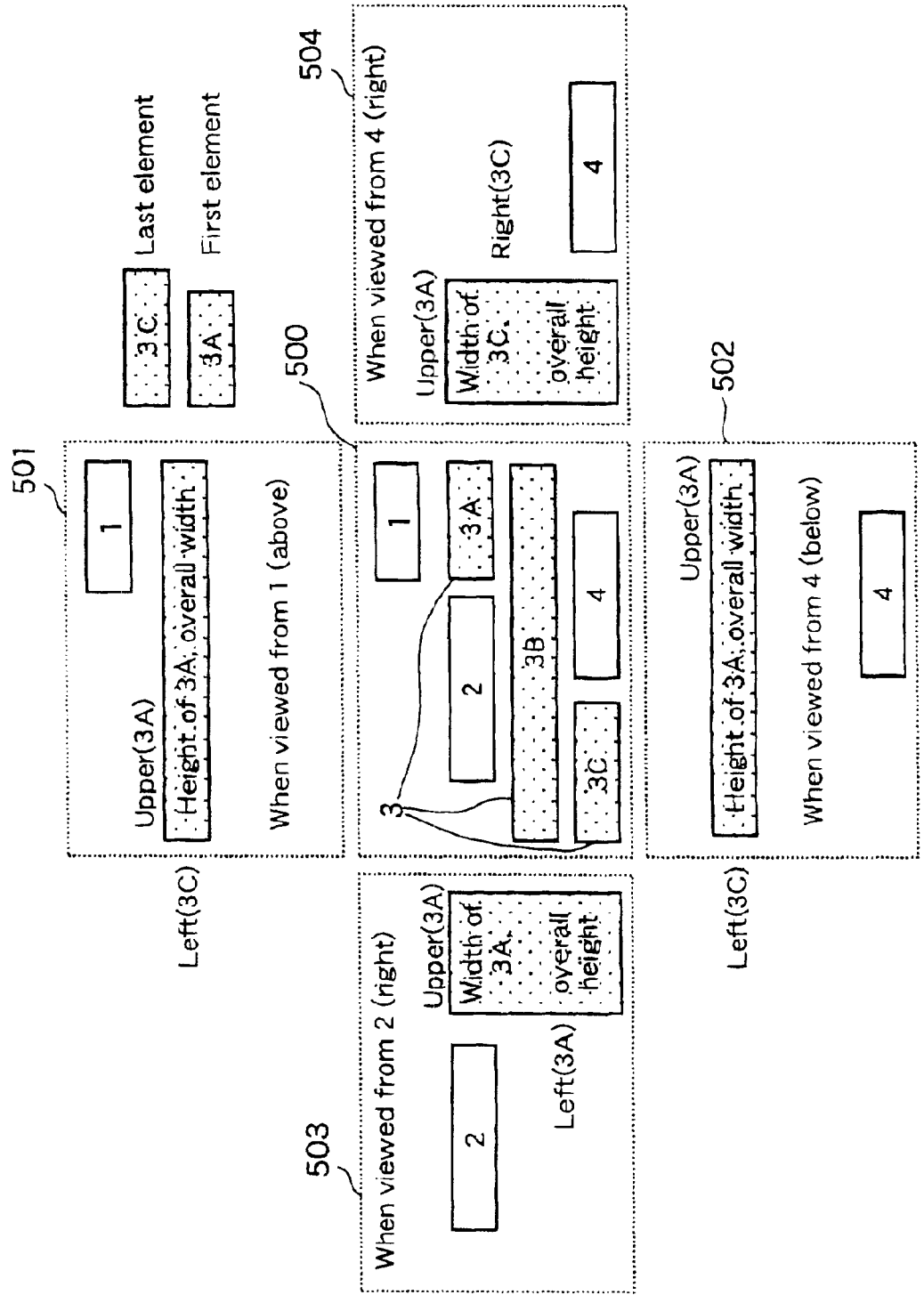
FIG. 20 is a view showing conversion processing for substitute position and size when an object for which a link is to be set has a plurality of distances according to a second embodiment of the present invention.

There is no problem if contents for which links are to be set are simple in form as shown in the first embodiment, but contents actually displayed on the Web have a variety of forms, and with Hyperlinks or the like, for example, there are cases where there is a plurality of lines produced by line feeds because of the length of the contents. FIG. 20 shows an example of such a case. In this drawing, reference numeral 500 denotes the state in which contents items (1) to (4) are displayed on the screen. As can be seen from the drawing, (3) is broken by line feeds so that the contents item is composed of a first element 3A, middle element 3B, and last element 3C, and is of such a form as to make it difficult to determine uniquely its position and distance relative to the other contents items. At this time, with the present invention, substitute position and size conversions are performed with the position, size, and observation direction of the first line and last line as parameters, and link setting is performed on the basis of the results of these conversions.

Looking to the right from (3), the horizontal coordinate of (3C) and vertical coordinate of (3A) are used for the substitute position of (3), and the size of (3C) is used for the size (width). Similarly, when looking downward, also, the horizontal coordinate of (3C) and vertical coordinate of (3A) are used, and the size of (3C) is used for the size (width). Also, at the time of looking to the right to (3) from other contents, the position and size of the shaded part of the left frame are used, and at the time of looking downward to (3), the position and size of the shaded part of the upper frame are used.

Concise notation for the substitute position and size for various observation directions using the above example in FIG. 20 can be given as follows.

1) Observation direction: When looking at (3) from 1 (upper) (501)

Substitute position=Upper (3A), left (3C)

Substitute size=Height (height of 3A), width (overall width)

2) Observation direction: When looking at 4 (lower) from (3) (502)

Substitute position=Upper (3A), left (3C)

Substitute size=Height (height of 3A), width (overall width)

3) Observation direction: When looking at (3) from 2 (right) (503)

Substitute position=Upper (3A), left (3C)

Substitute size=Height (overall height), width (width of 3A)

4) Observation direction: When looking at 4 (right) from (3) (504)

Substitute position=Upper (3A), right (3C)

Substitute size=Height (overall height), width (width of 3C)

The results of such conversions may be stored beforehand in memory, etc., alternatively, such conversions may be made as required when setting links.

Embodiment 3

By using the above-described first and second embodiments, it is possible to set links in a similar way for frames frequently used in Web pages, etc. A detailed description will be given below of link setting for contents within each frame and frames when there are a plurality of frames.

Figure 21:
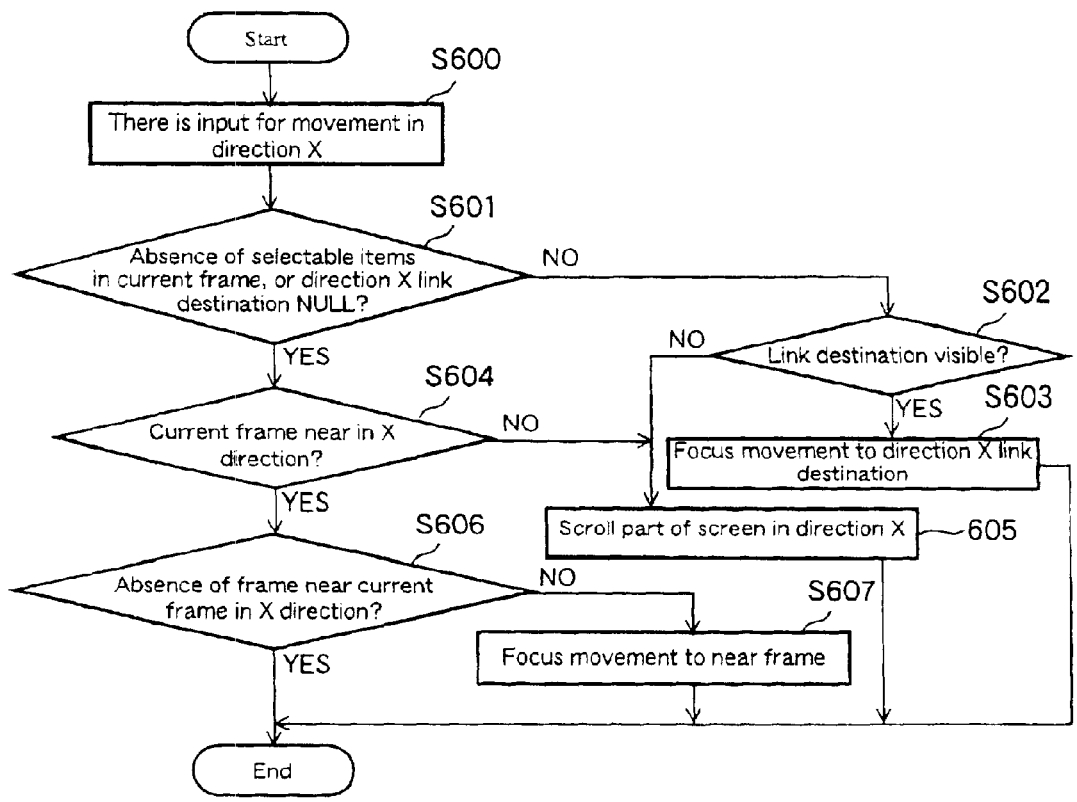
FIG. 21 is a flowchart showing details of inter-frame focus movement processing when there are a plurality of frames according to a third embodiment of the present invention.

It is assumed that the link tree formation method described in the first embodiment is provided independently for each frame. Therefore, within a frame, only the above described method can be applied. In this embodiment, inter-frame link setting is performed dynamically according to the frame display state (scroll state). To give a brief description of this dynamic link setting, at the time of setting a link from the object frame to another frame, if there are contents in that other frame, a link is set to the contents item at the shortest distance from the link origin among those contents. Also, in cases where there are contents in another frame but the contents are not displayed on the screen because of the scroll state of the frame, when a focus movement destination is input in the direction of that other frame, focusing alone is performed on that frame, and link setting to and focusing on the contents not displayed on the screen are not carried out. Also, if contents in the input movement direction are not visible even though they are present within the same frame, the frame only scrolls and focusing is not performed even if links have been set between the contents. Focusing can be carried out after the contents become visible. FIG. 21 is a flowchart showing the details of this kind of focus movement processing, and this flowchart is used in the following description.

First, if there is an input for movement in direction X (S600), it is determined whether there is no selectable content in the frame currently being focused on, or whether the direction X link destination is NULL within the frame currently being focused on (S601). If the result of S601 is NO, it is determined that there is a selectable content, that is, a focus movement destination, within the frame currently being focused on. Then, it is determined whether or not the focus movement destination is in a position visible to the user (S602). That is to say, as there are cases where a link destination is not displayed on the screen due to the scroll state of the frame, judgment on this is performed in S602. If the link destination is being displayed (S602, YES), the focus is moved to the direction X link destination (S603). If the link destination is not being displayed (S602, NO), part of the screen is scrolled in direction X so that the link destination is displayed on the screen, and the focus is moved to that link destination (S605).

Next, the processing when the result of S601 is YES will be described. In this case, it is determined that there is no selectable link destination in direction X within the frame currently being focused on, and it is then determined whether or not the current frame has been scrolled virtually to the limit in the direction of X (S604). If the result of S604 is NO, it is judged that there is room for scrolling of that frame in direction X, and part of the screen is scrolled in direction X (S605). If the result of S604 is YES, it is judged that there is no room for scrolling of that frame in direction X, and it is then determined whether or not there is another frame close to the frame currently being focused on in the X direction (S606). If there is another frame nearby (S606, NO), the focus is moved to that other nearby frame (S607). To give a detailed description of the operation in S607, the focus is moved as a link destination to the selectable contents item within the movement destination frame at the smallest distance from the selectable items currently being focused on. Also, if there are no selectable contents in the movement destination frame, the movement destination frame itself is focused on. Moreover, since the movement destination frame at this time will be the object of scrolling when there is the next input, information is held on it as the frame being focused on. If the result of S606 is YES, nothing is done and the processing ends.

Figure 22:
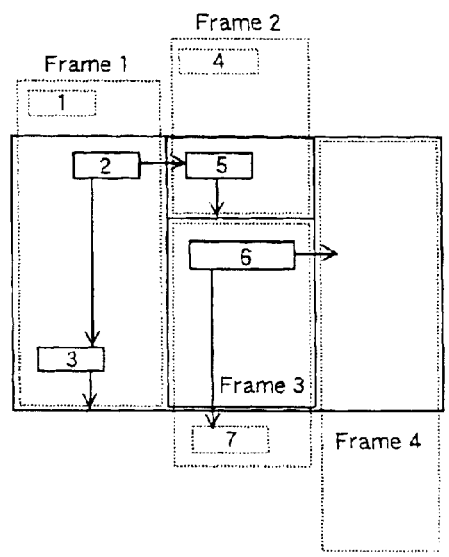
FIG. 22 is a view showing a concrete example of focus movement in the third embodiment.

As a concrete example, focus movement in the case of contents containing four frames as shown in FIG. 22 will be described below.

When the down-movement key is pressed while contents item (2) is being focused on: The focus is moved to contents item (3) (S603, intra-frame focus movement).

When the down-movement key is pressed while contents item (3) is being focused on: The downward link destination of contents item (3) is NULL (S601, YES), frame 1 cannot be scrolled downward (S604, YES), and there is no nearby frame in the downward direction (S606, YES), so nothing is done.

When the right-movement key is pressed while contents item (2) is being focused on: The right link destination of contents item (2) is NULL (S601, YES), frame 1 cannot be scrolled to the right (S604, YES), and there is an adjacent frame 2 in the right direction (S606, NO), so the focus is moved to frame 2 (S607). As contents item (5) is calculated as being at the shortest distance from contents item (2) according to the current position of frame 2, the focus is moved to contents item (5) (S607, inter-frame movement).

When the down-movement key is pressed while contents item (6) is being focused on: As link destination contents item (7) cannot yet be seen on the screen (S602, NO), focus movement to contents item (7) is skipped, and frame 2 is scrolled one part at a time so that contents item (7) can be seen (S605, intra-frame scrolling).

When the right-movement key is pressed while contents item (6) is being focused on: The right link destination of contents item (6) is NULL (S601, YES) and scrolling to the right is not possible (S604, YES), so the focus is moved to frame 4 nearby on the right (S607). However, as there are no selectable contents in frame 4, information on frame 4 is held, only, as a focus frame.

Various embodiments of the present invention have been described above, but the present invention is not limited to the above described embodiments, and various changes or modifications are possible without departing from the object or spirit of the present invention.

As described above, the present invention operates on the basis of both geometrical direction and distance for a plurality of objects displayed on a screen, and therefore makes it possible to form a link tree for focus movement by means of cross-shaped buttons or the like, for example, in a visually more logical and natural form than in the case of the conventional method whereby the order of a one-dimensional list is taken as an absolute condition. Consequently, when a browser that forms this kind of link tree is used, ease of use and excellent operability are provided to the user. Moreover, in link setting, at the time of setting a link from an m-th object to another object, if there are a plurality of linkable objects in the same direction, as viewed from the m-th object, the item for which the distance from the m-th object is the shortest is set as the link destination, thereby making possible link tree formation that achieves natural focus movement.

Also, by setting links in steps, the present invention allows links to be set more flexibly according to the object layout, and as a result makes it possible to form a link tree desirable to the user. Therefore, even with devices such as portable terminals and WebTVs that do not use a mouse device, but have only an input device such as a remote controller with few buttons or cross-shaped buttons, the present invention provides an apparatus that allows contents displayed on the screen to be subjected to focus movement or selected easily without any sense of incongruity, and that is easy to use for the user.

Moreover, the present invention can also be applied to frames frequently used in Home Pages or the like, and therefore enables link settings to be made easily to objects of other frames. In addition, the relevant link settings can be made dynamically according to the display state of contents that vary according to the scroll state of a frame, making it possible for link settings that include frames to be made in a visually natural fashion in the same way as described above. Also, by performing such link settings, natural on-screen frame movements and focus movements are ensured, further improving ease of use for the user.

What is claimed is:

1. A link tree forming apparatus for setting individually selectable links for a plurality of objects displayed on a screen to form an overall object link tree, said apparatus comprising:

position information acquiring unit acquiring position information for each object;

link setting unit setting, on the basis of said acquired position information, a link between an m-th object and an n-th object when only said n-th object exists in a predetermined direction with reference to said m-th object, said link setting unit alternatively setting a link based on a distance of each object from said m-th object in said predetermined direction when a plurality of objects exist in said predetermined direction with reference to said m-th object; and converting unit converting, when a plurality of distances from said m-th object to said n-th object are defined, the position and size of said n-th object into those of a substitute object, by using as parameters at least one of the positions, sizes and directions of said n-th object at the shortest distance and at the longest distance among said plurality of distances, wherein said position information acquiring unit acquires numeric values converted by said converting unit.

2. The link tree forming apparatus according to claim 1, wherein said link setting unit sets a link to the object at the shortest distance from said m-th object out of said plurality of objects existing in said predetermined direction.

3. The link tree forming apparatus according to claim 1, wherein said distance includes at least one of a screen horizontal-direction distance, a screen vertical-direction distance, and a distance based on both a screen horizontal direction and a vertical direction.

4. The link tree forming apparatus according to claim 1, wherein said link setting unit comprises:

first setting unit setting a link to an object that exists in a first direction satisfying a first condition from among said plurality of predetermined directions for each object; and second setting unit setting a link to an object that exists in a second direction for which no link has been set by said first setting unit from among said plurality of predetermined directions, said second direction satisfying a second condition.

5. The link tree forming apparatus according to claim 4, wherein said link setting unit comprises:

third setting unit setting a link to an object that exists in a third direction opposite to one of said first and second directions set by said first setting unit and said second setting unit, said third direction satisfying a third condition; and fourth setting unit setting a link to an object that exists in a fourth direction, opposite to the other of said first and second directions set by said first setting unit and said second setting unit, for which no link has been set by said third setting unit, said fourth direction satisfying a fourth condition.

6. The link tree forming apparatus according to claim 1, wherein said objects are of a variety of types including contents or frames including Hyperlinks and objects to be displayed by a Web browser.

7. The link tree forming apparatus according to claim 6, further comprising:

determining unit determining the types of said objects;

detecting unit, when an object is detected to be a frame by said determining unit, further detecting selectable objects other than a frame within said detected frame; and inter-frame link setting unit, when an object other than a frame within said detected frame is detected by said detecting unit, setting a link to said detected object within said detected frame from another frame.

8. The link tree forming apparatus according to claim 7, wherein with regard to settings by said inter-frame link setting unit, a link between objects is set only when a link destination object exists at a position that is visible on the screen, and such a link setting is variable according to a frame scroll state.

9. The link tree forming apparatus according to claim 1, wherein said link setting unit sets a link for performing focus movement on the basis of an input by unit of a cross-shaped button.

10. A link tree forming method for setting individually selectable links for a plurality of objects displayed on a screen to form an overall object link tree, said method comprising:

first processing for setting a link between an m-th object and an n-th object when only said n-th object exists in a predetermined direction with reference to said m-th object;

second processing for setting a link based on a distance of each object existing in a predetermined direction from said m-th object when a plurality of objects exist in said predetermined direction with reference to said m-th object; and a converting step of, when a plurality of distances from said m-th object to said n-th object are defined, converting the position and size of said n-th object into those of a substitute object, by using as parameters at least one of positions, sizes and directions of said n-th object at the shortest distance and at the longest distance among said plurality of distances, wherein said first processing and said second processing are executed on the basis of numeric values converted in said converting step.

11. The link tree forming method according to claim 10, wherein said second processing comprises:

a first step of setting a link to an object that exists in a first direction satisfying a first condition from among a plurality of predetermined directions for each object; and a second step of setting a link to an object that exists in a second direction for which no link has been set in said first step from among said plurality of predetermined directions, said second direction satisfying a second condition.

12. The link tree forming method according to claim 11, wherein said second processing comprises:

a third step of setting a link to an object that exists in a third direction opposite to one of said first and second directions set in said first step and said second step, said third direction satisfying a third condition; and a fourth step of setting a link to an object that exists in a fourth direction, opposite to the other of said first and second directions set in said first step and said second step, for which no link has been set in said third step, said fourth direction satisfying a fourth condition.

13. The link tree forming method according to claim 10, wherein, when setting a link to an object existing within a frame from another frame, a link to that object is set only when that object exists at a position that is visible on the screen, and such a link setting is variable according to a frame scroll state.

14. A link tree forming program for setting individually selectable links for a plurality of objects displayed on a screen to form an overall object link tree, said program adapted to execute on a computer:

first processing for setting a link between an m-th object and an n-th object when only said n-th object exists in a predetermined direction with reference to said m-th object;

second processing for setting a link based on a distance of each object existing in a predetermined direction from said m-th object when a plurality of objects exist in said predetermined direction with reference to said m-th object; and a converting step of, when a plurality of distances from said m-th object to said n-th object are defined, converting the position and size of said n-th object into those of a substitute object, by using as parameters at least one of positions, sizes and directions of said n-th object at the shortest distance and at the longest distance among said plurality of distances, wherein said first processing and said second processing are executed on the basis of numeric values converted in said converting step.

15. The link tree forming program according to claim 14, wherein said second processing make said computer to execute:

a first step of setting a link to an object that exists in a first direction satisfying a first condition from among a plurality of predetermined directions for each object; and a second step of setting a link to an object that exists in a second direction for which no link has been set in said first step from among said plurality of predetermined directions, said second direction satisfying a second condition.

16. A computer-readable recording medium having a link tree forming program recorded thereon, said program adapted to execute on a computer, when setting individually selectable links for a plurality of objects displayed on a screen to form an overall object link tree, first processing for setting a link between an m-th object and an n-th object when only said n-th object exists in a predetermined direction with reference to said m-th object, second processing for setting a link based on a distance of each object existing in a predetermined direction from said m-th object when a plurality of objects exist in said predetermined direction with reference to said m-th object; and a converting step of, when a plurality of distances from said m-th object to said n-th object are defined, converting the position and size of said n-th object into those of a substitute object, by using as parameters at least one of positions, sizes and directions of said n-th object at the shortest distance and at the longest distance among said plurality of distances, wherein said first processing and said second processing are executed on the basis of numeric values converted in said converting step.

* * * * *